May 20, 1930.  G. W. BOGDANFFY  1,759,090
WARPING MACHINE INDICATOR
Filed May 11, 1929  2 Sheets-Sheet 1
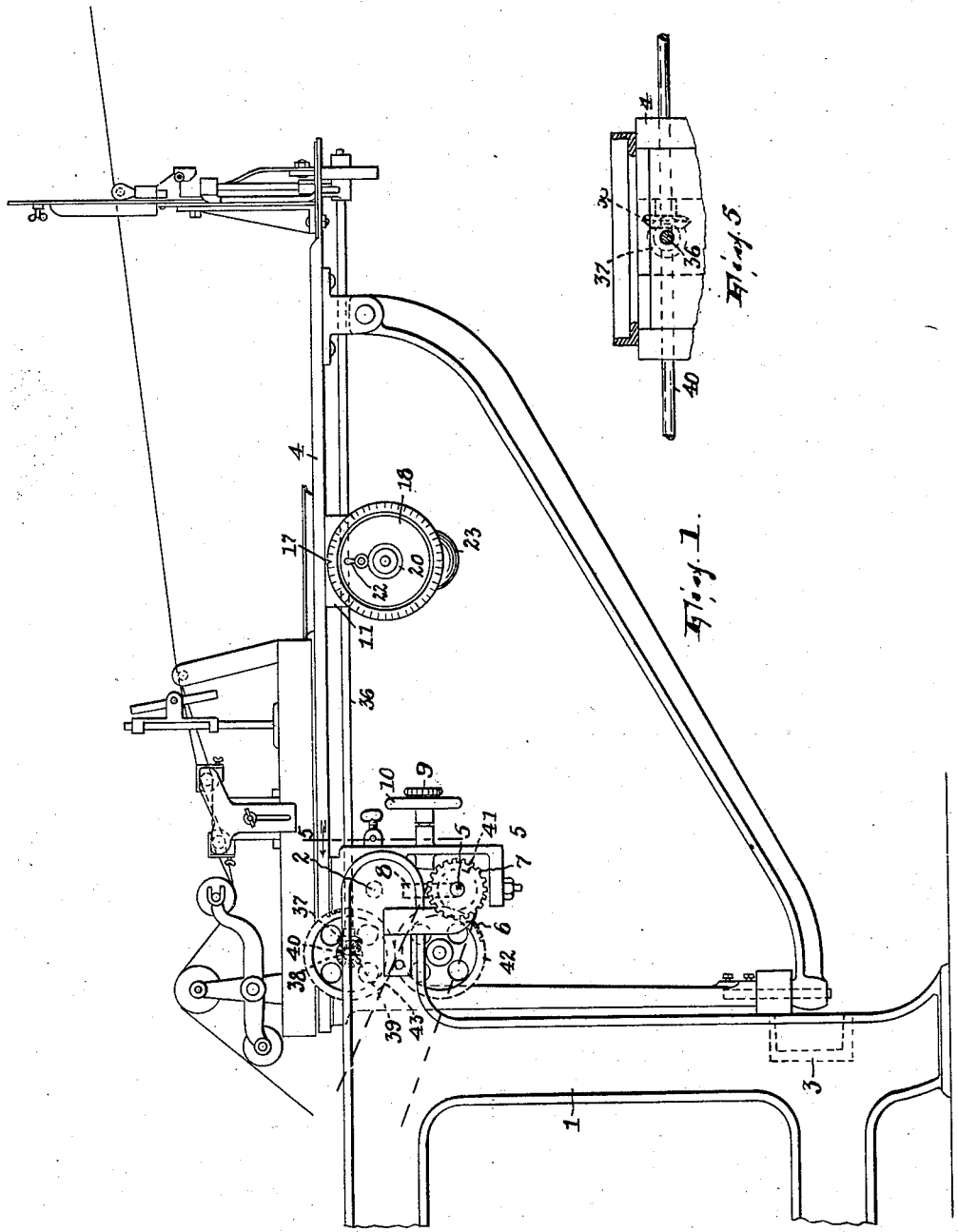
INVENTOR,
George W. Bogdanffy.
BY
ATTORNEY.

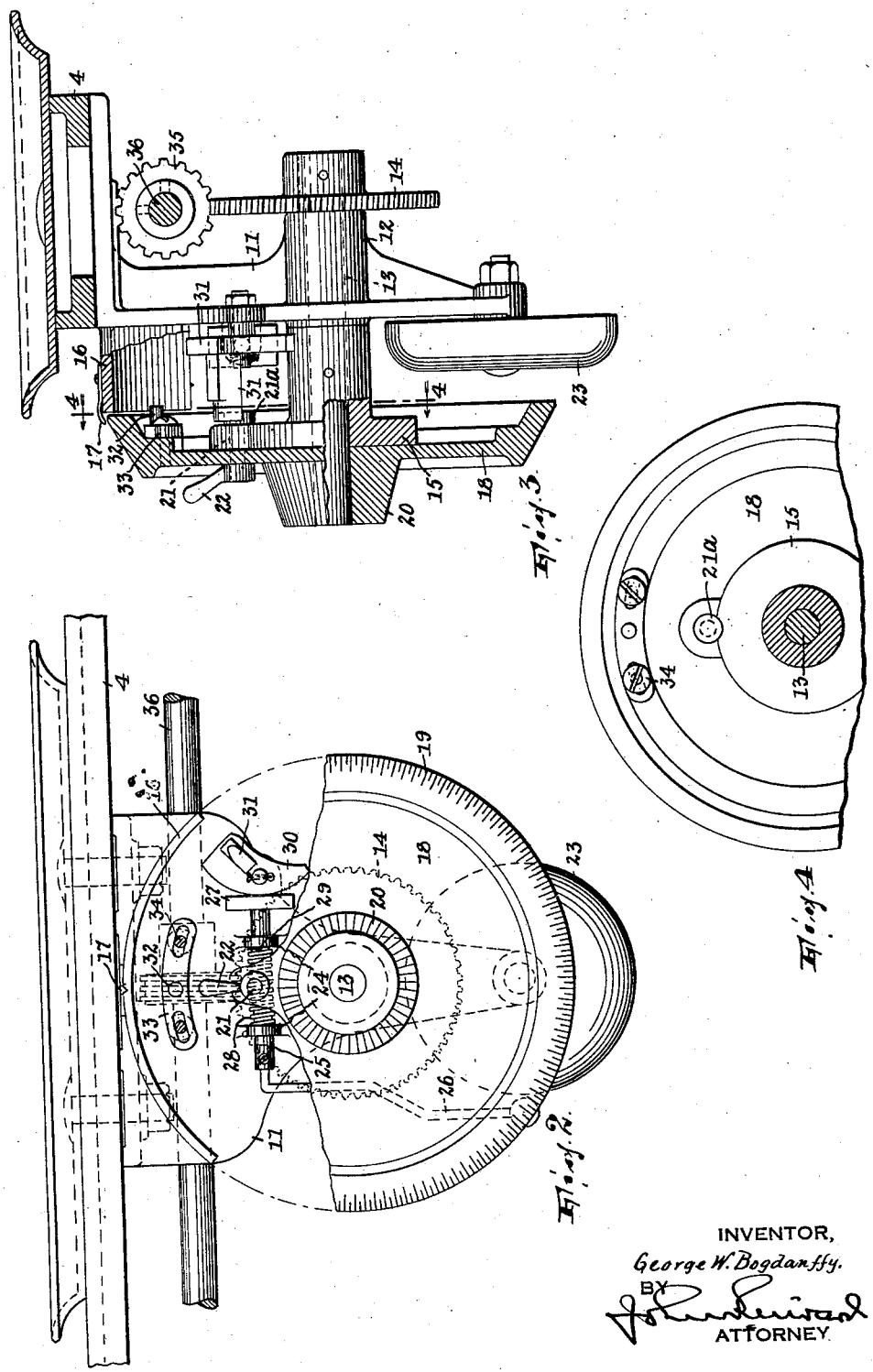

Patented May 20, 1930

1,759,090

UNITED STATES PATENT OFFICE

GEORGE W. BOGDANFFY, OF CLIFTON, NEW JERSEY, ASSIGNOR, BY MESNE ASSIGNMENTS, TO SIPP EASTWOOD CORPORATION, OF PATERSON, NEW JERSEY, A CORPORATION OF NEW JERSEY

WARPING-MACHINE INDICATOR

Application filed May 11, 1929. Serial No. 362,259.

In so-called horizontal or Swiss warping machines it is usual to provide a device, termed a "clock", for indicating the extent of yardage wound on the reel. This is usually arranged on the frame at one end of and geared to the reel shaft and as so positioned it is so far away from the warper who stands near the reed carriage that it cannot be read with any accuracy or reset without her leaving her usual position and approaching the clock. My principal object is to place the clock so that it may be easily read by the warper in her usual position, wherefore I mount it on the reed carriage, where it is so positioned as not to interfere with the warping or the warper's movements and is nevertheless easily readable by her, and I arrange to drive it from the reel in such a way as to permit the clock to partake of the traverse motion of the carriage.

In the drawing,

Fig. 1 shows in side elevation a part of the machine frame and the reed carriage thereon embodying the invention;

Fig. 2 is a similar elevation, on a larger scale and partly broken away, of the clock and fragments of the carriage and its driving means;

Fig. 3 is a vertical section, central of the clock, of what is shown in Fig. 2;

Fig. 4 is a section on line 4—4, Fig. 3; and

Fig. 5 is a section on line 5—5, Fig. 1.

In the frame 1 is traversable on the fixed shaft 2 and in contact with rail 3 thereof the reed carriage 4. 5 is a worm journaled in the frame at 6 and suitably rotated from the reel (or other going part of the machine geared to rotate therewith) by a sprocket-and-chain means 7, and the carriage is adapted to obtain traverse motion from this revolving worm through a worm-wheel 8 when the latter is held against rotation by a clamping means the nut of which is shown at 9, all substantially the same as in the Adsit Patent No. 1,457,293; when said clamping means is loosened the carriage may be traversed by hand by turning the hand-wheel 10 of the worm-wheel, which then runs along the worm. Since the worm rotates in synchrony with the reel it affords means from which the moving part of the clock, now to be described, may be rotated.

A bracket 11, forming the fixed element of the clock, depends from the carriage 4 and in a bearing 12 thereof is journaled a horizontal cross-shaft 13 on one end of which under the carriage is pinned a worm gear 14 and on the other end a face-plate 15. The bracket has an arcuate overhang 16 provided with a pointer 17. On the shaft is revoluble a dial 18 provided with a scale 19 at its conical periphery, with which the pointer cooperates, and having a central knob 20. The dial has a bolt 21 penetrating it which extends across the periphery of face-plate 15 and has its head $21^a$ overlapping the latter, its outer or threaded end having a clamping nut 22. When this nut is tightened the dial rotates with the part 13—14—15. Bracket 11 carries a gong 23 and in lugs 24 on the bracket slides a plunger 25 having a striker 26 for the gong and a head 27 and being normally urged to the right (Fig. 2) by a spring 28 interposed between one lug and a pin 29 in the plunger. A cam 30 is pivoted in the bracket beside the head 27 and a lug 31 thereon is adapted to be wiped by a stud 32 projecting from a plate 33 adjustable in an arc about the center of the dial upon loosening its clamping means 34, as screws.

Gear 14 of the rotary element 14—13—15 of the clock meshes with a worm member 35 fixed to a shaft 36 journaled in the carriage. This shaft has affixed thereto a beveled gear 37 which meshes with a bevel gear 38 splined at 39 (Fig. 1) on a shaft 40 which is journaled in the frame and is rotated from worm 5, when the latter is rotating, through intermeshing gearing 41—42—43.

It will be seen that by this invention the clock is at all times close to the operator whose usual place is at one side (usually the left) of the reed carriage, so that she cannot only readily see the dial-reading but can conveniently reset the clock without leaving her place.

Further, that the construction of the entire mechanism is such that it is simple as well as reliable and efficient and compact and out of the way of the material being warped and the operator, especially since the parts are below the top surface of the reed carriage.

The zero point on the scale should be positioned with reference to stud 32 so as to be opposite pointer 17 when the stud, on passing the lug 31 of the cam, has released the latter and so sounded the gong. To set the clock, therefore, the warper releases the nut 22 and turns the dial until the index thereon corresponding to the number of yards to be indicated is opposite the pointer, thereupon reclamping the dial to the face-plate by means of the nut. Thereupon, when the warping operation ensues the dial will rotate in synchrony with the traverse of the carriage, the gong being sounded when the zero point coinsides again with the pointer.

Having thus fully described my invention what I claim is:

1. In combination, the frame of a warping machine, a reed carriage traversable therein, rotating means operatively connected with the carriage to cause traverse motion thereof, a clock arranged on the carriage and including a fixed element and a rotary element, said elements having a cooperating pointer and scale, and means to transmit motion from the first means to said rotary element.

2. In combination, the frame of a warping machine, a reed carriage traversable therein, rotating means operatively connected with the carriage to cause traverse motion thereof and including a shaft journaled in the frame parallel with the path of traverse of the carriage, a clock arranged on the carriage and including a fixed element and a rotary element, said elements having a cooperating pointer and scale, a gear splined on the shaft and traversable with the carriage, and transmission means journaled in the carriage and gearing said rotary element with the gear.

In testimony whereof I affix my signature.

GEORGE W. BOGDANFFY.